POLYBLEND PROPERTIES

INVENTORS
HUGH E. SNODGRASS
ROBERT L. LAUCHLAN
BY Thomas A. Beck
ATTORNEY

United States Patent Office  3,631,126
Patented Dec. 28, 1971

3,631,126
POLYPHENYLENE OXIDE RESINS MODIFIED
WITH POLYHYDROXY ETHERS
Hugh E. Snodgrass, Mishawaka, and Robert L. Lauchlan, Granger, Ind., assignors to Uniroyal, Inc., New York, N.Y.
Filed Aug. 10, 1970, Ser. No. 62,452
Int. Cl. C08g 45/06, 45/00, 9/02
U.S. Cl. 260—830 R    27 Claims

ABSTRACT OF THE DISCLOSURE

Blends of poly(phenylene ether) resins with poly(hydroxy ether) resins provide thermoplastic compositions characterized by unique properties, particularly, significantly reduced melt viscosities and correspondingly improved melt processing characteristics, as well as increased stiffness and rigidity.

---

The present invention relates to modified poly(phenylene ether) resin compositions characterized by reduced melt viscosities and improved melt processing characteristics, as well as increased stiffness and rigidity properties compared with the properties of unmodified poly(phenylene ether) resins. More particularly, the invention relates to the thermoplastic resin blend of a poly(phenylene ether) resin with a poly(hydroxy ether) resin.

BACKGROUND OF THE INVENTION

The poly(phenylene ether) resins are known and described in numerous publications including U.S. Pats. Nos. 3,306,874 and 3,306,875 of Allen S. Hay and U.S. Pats. Nos. 3,257,357 and 3,257,358 of Gelu Stoeff Stamatoff. These high molecular weight resins are high performance thermoplastics possessing relatively high softening points, i.e., in excess of 350° F., and excellent dimensional stability.

Melt processing of such resins, however, requires temperatures in excess of 400° F., and even at these temperatures the poly(phenylene ether) resins exhibit high viscosities in excess of $6 \times 10^5$ poises. The high viscosities result in poor processing characteristics, thereby restricting the uses of the unmodified poly(phenylene ether) resins which otherwise possess good thermal properties and high mechanical strengths.

STATEMENT OF THE INVENTION

The thermoplastic compositions of the present invention possess substantially reduced melt viscosities and significantly improved melt processing characteristics. The incorporation of the poly(hydroxy ether) resin into the poly(phenylene ether) resin does not adversely affect the mechanical strength and thermal properties of said poly(phenylene ether) resin.

A further advantage is that the incorporation of a poly(hydroxy ether) resin imparts improved rigidity and stiffness to the poly(phenylene ether) resin.

DESCRIPTION OF THE INVENTION

Figure 1:
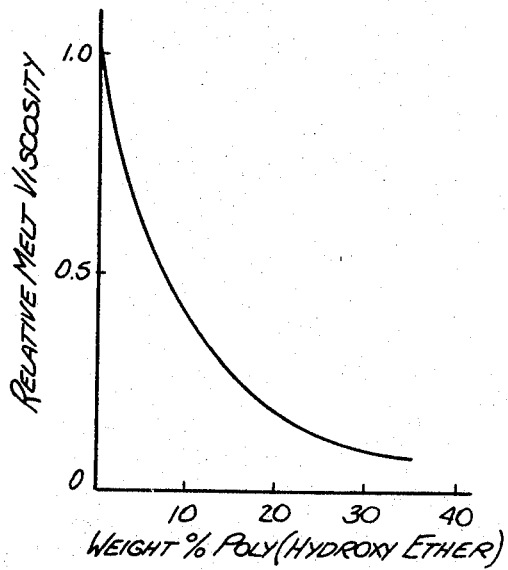
FIG. 1 illustrates the relative melt viscosities of poly(phenylene ether)-poly(hydroxy ether) resin blend as compared to the unmodified poly(phenylene ether) resin. Note that the incorporation of the poly(hydroxy ether) resin significantly reduces the melt viscosity of the poly(phenylene ether) resin, and that reduction in melt viscosity is almost directly proportional to the concentration of poly(hydroxy ether) resin in the blended compositions.

The present invention provides polyblends containing: (A) between about 60 and 98 percent (all percentages are expressed by weight herein) of a poly(phenylene ether) resin in admixture with (B) between about 2 and 40 percent of a poly(hydroxy ether) resin.

The poly(phenylene ether) resins with which this invention is concerned are those having the repeating structural unit of the formula:

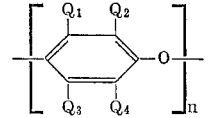

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halogen, hydrocarbon radicals free of tertiary alpha-carbon atoms, halohydrocarbon radicals having at least two carbon atoms between the halogen atom and phenol nucleus and being free of tertiary alpha-carbon atoms, hydrocarbonoxy radicals free of tertiary alpha-carbon atoms, and halohydrocarbonoxy radicals having at least two carbon atoms between the halogen atom and phenol nucleus and being free of tertiary alpha-carbon atoms.

Typical examples of such polymers and methods of making same are found in U.S. Pats. 3,306,874; 3,306,875; 3,257,357; 3,361,851; and New Linear Polymers, by Lee et al., N.Y., McGraw-Hill, 1967, pages 61–82, the contents of which patents and text are incorporated herein by reference.

The preferred poly(phenylene ether) resins are those having alkyl substitution ortho to the oxygen ether atom and most preferably, ortho metyl substitution. Such polymers are readily available on a commercial basis and combine with the poly(hydroxy ether) resins to form homogeneous thermoplastic compositions which exhibit excellent melt processing characteristics.

The poly(hydroxy ether) resins used in the present invention consist of repeating units which may be represented by the general formula:

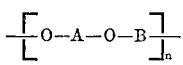

wherein A is the residuum of a dihydric phenol, B is a hydroxyl containing residuum of an epoxide, and $n$ is a positive integer and is at least 30, preferably 80 or more.

It is preferred that the dihydric phenol (A) be a weakly acidic dinuclear phenol such as, for example, the dihydroxy diphenyl alkanes or the nuclear halogenated derivatives thereof, which are commonly known as bisphenols. Suitable dihydric phenols include, for example: 2,2-bis-(4-hydroxy phenol)propane (Bisphenol A); 2,2-bis-(3,5-dichloro-4-hydroxy phenyl)propane (Tetrachlorobisphenol A); 2,2 - bis - (3,5-dibromo-4-hydroxy phenyl)propane (Tetrabromobisphenol A); bis - (4 - hydroxy phenyl) methane (Bisphenol F); 1,1-bis-(4-hydroxy phenyl)-2-phenyl ethane (Bisphenol ACP); bis-(4-hydroxy phenyl) sulfone (Bisphenol S); etc.

It is preferred that the hydroxyl containing epoxide residuum (B) be a saturated monoepoxide, i.e., a compound containing an oxirane group (oxygen bonded to two vicinal aliphatic carbon atoms, that is:

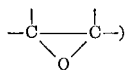

Even more preferred are the halogen substituted saturated monoepoxides, commonly referred to as epihalohydrins. Suitable monoepoxides include, for example: epichlorohydrin; epibromohydrin; 1,2-epoxy-1-methyl-3-chloropropane; 1,2-epoxy-1-butyl-3-chloropropane; 1,2-epoxy-2-methyl-3-fluoropropane, etc.

Typical examples of such polymers and methods of making same are found in U.S. Pats. 3,262,988 of W. H. Joyce, 3,375,297 of B. P. Barth et al., and 3,409,581 of J. W. Hagan, the contents of which are incorporated herein by reference.

The preferred poly(hydroxy ether) resins are those derived from a bisphenol, or nuclear halogenated derivative thereof, and saturated monoepoxide, or halogen substituted derivative thereof. Most preferred is the poly(hydroxy ether) resin which is the reaction product of 2,2-bis-(4-hydroxy phenyl)propane and epichlorohydrin, as this resin is readily available.

The method of blending the poly(phenylene ether)resin and poly(hydroxy ether)resin is not critical and does not constitute a part of the invention. Preferably the polymer resins are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at sufficiently high temperatures to soften the polymers so that they are thoroughly dispersed and intermingled with each other.

Alternatively the polymer resins may be solution blended by dissolving the polymers in a solvent such as dimethyl formamide and subsequently precipitating the polymer blend by adding the solution to a non-solvent such as isopropanol, producing a homogeneous blend which is then dried by any suitable method.

The mixtures of the invention may contain certain other additives to plasticize, lubricate, dye, pigment, prevent oxidation of, retard flammability of, etc., the polymer resin blends. Such additives are well known in the art and may be incorporated without departing from the scope of the invention.

The benefits obtained by blending a poly(hydroxy ether) resin with a poly(phenylene ether) resin are illustrated in the following examples which are set forth as a further description of the invention, but are not to be construed as limiting the invention thereto.

Melt viscosity data, for the poly(phenylene ether) resin-poly(hydroxy ether) resin blends described in the following examples, was obtained on an Instron capillary rheometer, according to the procedures described in Capillary Rheometry by R. L. Ballman and J. J. Brown. Briefly, the procedure entailed determining the apparent viscosity of the compositions at an arbitrarily chosen constant shear rate and constant temperature. For comparative purposes, the viscosities of the polymer resin blends were then normalized to the viscosity of the unmodified poly(phenylene ether) resin, i.e., relative viscosities were defined by the relation:

$$N_R = \frac{N_B}{N_{PPO}}$$

wherein $N_B$ is the apparent melt viscosity of the poly(phenylene ether) resin-poly(hydroxy ether) resin blend; $N_{PPO}$ is the apparent melt viscosity of the unmodified poly(phenylene ether) resin; and $N_R$ is then the relative viscosity.

The test data included in the following examples was determined according to ASTM procedures:

D790-66—Elastic modulus in flexure
D648-56—Heat distortion temperature (@ 264 p.s.i.)
D638-64T—Tensile strength

EXAMPLE 1

A poly(hydroxy ether) resin was blended with a poly(phenylene ether) resin at the 2 percent by weight level. The particular poly(hydroxy ether) resin was the reaction product of 2,2-bis(4-hydroxy phenyl) propane and epichlorohydrin, manufactured by the Union Carbide Corporation and designated Phenoxy PKHH. The poly(hydroxy ether) resin had a molecular weight of about 31,000 and was characterized by a specific gravity of 1.18 and a Vicat softening point of 210° F. (ASTM D1525).

The particular poly(phenylene ether) resin was a poly(2,6-dimethyl-1,4-phenylene ether) resin, manufactured by the General Electric Company and designated PPO 531–801. The poly(phenylene ether) resin had a molecular weight of about 30,000 and was characterized by a specific gravity of 1.06 and a Vicat softening point of 450° F. (ASTM D1525).

The blending operation was accomplished via a Banbury internal shear mixer. The poly(hydroxy ether) resin and poly(phenylene ether) resin were mixed in a molten state at or above a temperature of 465° F. and at a mean shear rate of approximately 300 sec.$^{-1}$. A mixture time of 7½ minutes was sufficient to obtain a homogeneous blend of the poly(hydroxy ether) resin and poly(phenylene ether) resin. The blends were then calendered into sheet material, at 500° F., and subsequently compression molded into plaques ¼ inch in thickness, at 500° F. and 350 p.s.i., from which test specimens were machine cut. The compound was also granulated in order to obtain melt viscosity data, which was measured at a constant temperature of 535° F. and a constant shear rate of 7.5 sec.$^{-1}$, as previously described.

Figure 2:
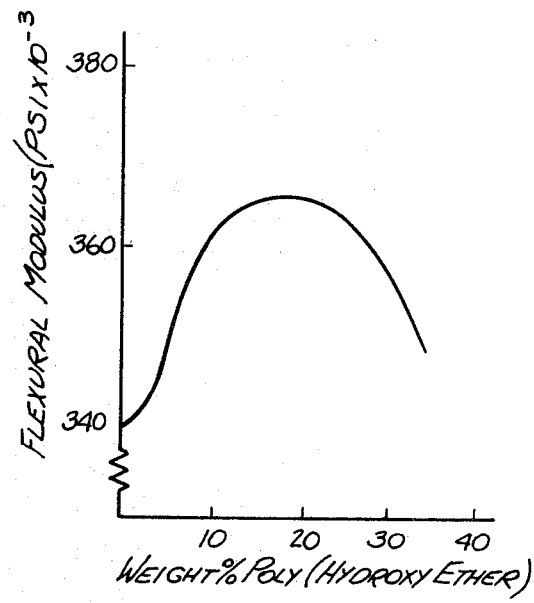
FIG. 2 represents the relation between the flexural modulus (ASTM D790-66) and the concentration of poly(hydroxy ether) resin in the blended compositions. In all cases, the addition of the poly(hydroxy ether) resin substantially increases the stiffness and rigidity of the poly(phenylene ether) resin.
Figure 3:
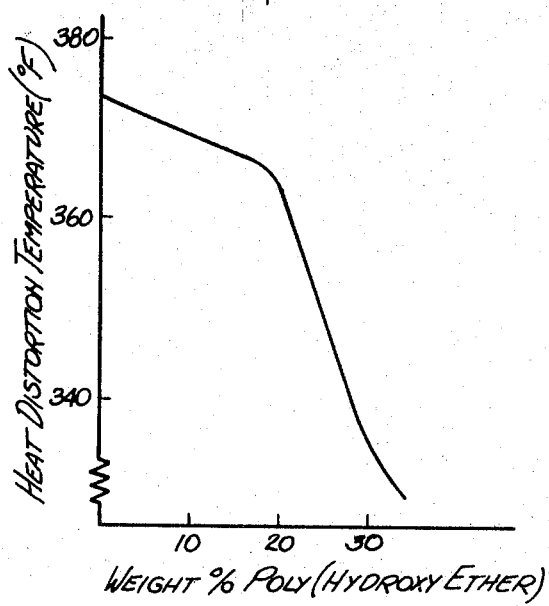
FIG. 3 represents the relation between the heat distortion temperature (ASTM D648-56) and the concentration of poly(hydroxy ether) resin in the blended compositions. Note that the incorporation of a poly(hydroxy ether) resin does not significantly reduce the high heat distortion temperature of the poly(phenylene ether) resin.
Figure 4:
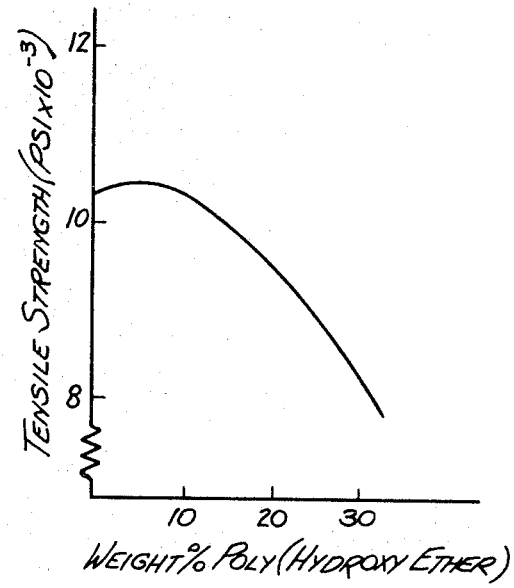
FIG. 4 represents the relation between the tensile strength (ASTM D638-64T) and the concentration of poly(hydroxy ether) resin in the blended compositions. Note that the incorporation of a poly(hydroxy ether) resin does not detrimentally affect the tensile strength of the poly(phenylene ether) resin.

As shown in FIG. 1, the addition of 2 percent by weight poly(hydroxy ether) resin to the poly(phenylene ether) resin, results in a composition having a relative melt viscosity reduced by a factor of 20 percent when compared to the unmodified poly(phenylene ether) resin. Such a composition exhibits significantly improved flow properties and melt processing characteristics. Note, also, that the incorporation of the poly(hydroxy ether) resin increases the rigidity and stiffness of the poly(phenylene ether) resin (FIG. 2), and does not adversely affect the heat distortion temperature or tensile strength of the resin (FIGS. 3 and 4). Test data is summarized in Table I.

EXAMPLE 2

A poly(hydroxy ether) resin was blended with a poly(phenylene ether) resin at the 5 percent by weight level. The resins employed were those described in Example 1.

The blended composition was mixed and fabricated according to the procedure described in Example 1. Upon evaluation of the blended composition it was observed that the addition of 5 percent by weight poly(hydroxy ether) resin had reduced the relative melt viscosity of the (poly(phenylene ether) resin by a factor of 40 percent). Additionally, the incorporation of the poly(hydroxy ether) resin improved the stiffness and rigidity of the poly(phenylene ether) resin, without detrimentally affecting the heat distortion temperature or the tensile strength of the poly(phenylene ether) resin. Test data is summarized in Table I and illustrated in FIGS. 1–4.

EXAMPLE 3

A poly(hydroxy ether) resin was blended with a poly(phenylene ether) resin at the 10 percent by weight level. The resins employed were those described in Example 1. The blended composition was mixed and fabricated according to the procedure described in Example 1. Upon evaluation of the blended composition it was observed that the addition of 10 percent by weight poly(hydroxy ether) resin had reduced the relative melt viscosity of the poly(phenylene ether) resin by a factor of 73 percent. Additionally, the incorporation of the poly(hydroxy ether) resin improved the stiffness and rigidity of the poly(phenylene ether) resin, without detrimentally affecting the heat distortion temperature or the tensile strength of the poly(phenylene ether) resin. Test data is summarized in Table I and illustrated in FIGS. 1–4.

EXAMPLE 4

A poly(hydroxy ether) resin was blended with a poly(phenylene ether) resin at the 20 percent by weight level. The resins employed were those described in Example 1. The blended composition was mixed and fabricated according to the procedure described in Example 1. Upon evaluation of the blended composition it was observed that the addition of 20 percent by weight poly(hydroxy ether) resin had reduced the relative melt viscosity of the poly(phenylene ether) resin by a factor of 84 percent. Additionally, the incorporation of the poly(hydroxy ether) resin improved the stiffness and rigidity of the poly(phenylene ether) resin, without detrimentally affecting the heat distortion temperature or the tensile strength of the poly(phenylene ether) resin. Test data is summarized in Table I and illustrated in FIGS. 1–4.

EXAMPLE 5

A poly(hydroxy ether) resin was blended with a poly(phenylene ether) resin at the 30 percent by weight level. The resins employed were those described in Example 1. The blended composition was mixed and fabricated according to the procedure described in Example 1. Upon evaluation of the blended composition it was observed that the addition of 30 percent by weight poly(hydroxy ether) resin had reduced the relative melt viscosity of the poly(phenylene ether) resin by a factor of 105 percent. Test data is summarized in Table I and illustrated in FIGS. 1–4.

EXAMPLE 6

A poly(hydroxy ether) resin was blended with a poly(phenylene ether) resin at the 35 percent by weight level. The resins employed were those described in Example 1. The blended composition was mixed and fabricated according to the procedure described in Example 1. Upon evaluation of the blended composition it was observed that the addition of 35 percent by weight poly(hydroxy ether) resin had reduced the relative melt viscosity of the poly(phenylene ether) resin by a factor of 115 percent. Test data is summarized in Table I and illustrated in FIGS. 1–4.

The relative melt viscosity of a poly(phenylene ether) resin is substantially reduced through blending with that resin a poly(hydroxy ether) resin in amounts approximately up to 40 percent by weight. Correspondingly, these compositions exhibit significantly improved flow and melt processing characteristics.

Because of their unique combination of physical properties and excellent thermal properties, the polymer blends of this invention have many and varied uses. For example, they can be used in molding powder formulations either alone or mixed with various fillers such as wood, flour, diatomaceous earth, carbon black, silica, etc., to make molded parts such as gears, bearings, and cams, especially for applications where high rigidity and dimensional stability are required. They can be used to prepare molded, calendered, or extruded articles and can be applied to a broad spectrum of uses in the form of sheets, rods, etc. The compositions may also be mixed with various modifying agents such as dyes, pigments, stabilizers, plasticizers, etc.

TABLE I.—COMPARISON OF RESIN AND POLYBLEND PROPERTIES

| | Poly-(hydroxy ether) resin, percent by weight | Relative melt viscosity | Flexural modulus (p.s.i.) | Heat distortion temperature (° F.) | Tensile strength (p.s.i.) |
|---|---|---|---|---|---|
| Control data, PPO 531-801 | | 1.000 | 342,000 | 374 | 10,400 |
| Example: | | | | | |
| 1 | 2 | 0.800 | 344,000 | 373 | 10,500 |
| 2 | 5 | 0.600 | 352,000 | 372 | 10,600 |
| 3 | 10 | 0.370 | 361,000 | 370 | 10,400 |
| 4 | 20 | 0.160 | 368,000 | 368 | 9,200 |
| 5 | 30 | 0.095 | 359,000 | 341 | 8,600 |
| 6 | 35 | 0.085 | 350,000 | 320 | 8,000 |

Obviously, other modifications and variations of the present invention are possible in light of the above disclosures. It is, therefore, to be understood that changes may be made in the particular embodiments of the invention described which are within the full intended scope of the invention as defined by the appended claims.

We claim:
1. A thermoplastic blended composition comprising:
   (a) between about 60% and 98% by weight of a thermoplastic polyphenylene oxide resin having the repeating unit:

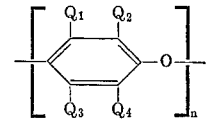

wherein the oxygen ether atom of one unit is connected to the benzene nucleus of the next adjoining unit, $n$ is a positive integer and is at least 100, and $Q_1$ thru $Q_4$ are monovalent substituents, each selected from the group consisting of hydrogen, halogen, hydrocarbon radicals free of tertiary alpha-carbon atoms, halohydrocarbon radicals having at least two carbon atoms between the halogen atom and phenol nucleus and being free of tertiary alpha-carbon atoms, and halohydrocarbonoxy radicals having at least two carbon atoms between the halogen atom and phenol nucleus and being free of tertiary alpha-carbon atoms, and halohydrocarbonoxy radicals having at least two carbon atoms between the halogen atom and phenol nucleus and being free of tertiary alpha-carbon atoms, and
   (b) between about 40% and 2% by weight of a poly(hydroxy ether) resin composed of repeating units having the general formula:

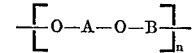

wherein A is the residuum of a dihydric phenol, B is a hydroxyl containing residuum of an epoxide and $n$ is a positive integer greater than 30.

2. A resin blend of claim 1 where the polyphenylene oxide resin is a poly(2,6-dialkyl-1,4-phenylene) oxide resin.

3. A resin blend of claim 2 where the polyphenylene oxide resin is a poly(2,6-dimethyl-1,4-phenylene) oxide resin.

4. A resin blend of claim 3 wherein the dihydric phenol residuum (A) is a weakly acidic dinuclear phenol, and the hydroxyl containing epoxide residuum (B) is a saturated monoepoxide.

5. A resin blend of claim 4 wherein the dihydric phenol residuum (A) is a dihydroxyl diphenyl alkane.

6. A resin blend of claim 4 wherein the dihydric phenol residuum (A) is a halogen substituted derivative of a dihydroxy diphenyl alkane.

7. A resin blend of claim 4 wherein the dihydric phenol residuum (A) is 2,2-bis(4-hydroxy phenyl)propane.

8. A resin blend of claim 4 wherein the dihydric phenol residuum (A) is bis-(4-hydroxy phenyl) methane.

9. A resin blend of claim 4 wherein the dihydric phenol residuum (A) is 1,1-bis-(4-hydroxy phenyl)-2-phenyl ethane.

10. A resin blend of claim 4 wherein the dihydric phenol residuum (A) is 2,2-bis(monochloro-4-hydroxy phenyl)propane.

11. A resin blend of claim 4 wherein the dihydric phenol residuum (A) is 2,2-bis(monobromo-4-hydroxy phenyl)propane.

12. A resin blend of claim 4 wherein the dihydric phenol residuum (A) is 2,2-bis(dichloro-4-hydroxy phenyl) propane.

13. A resin blend of claim 4 wherein the dihydric phenol residuum (A) is 2,2-bis(dibromo-4-hydroxy phenyl)propane.

14. A resin blend of claim 4 wherein the dihydric phenol residuum (A) is bis(4-hydroxy phenyl) ketone.

15. A resin blend of claim 4 wherein the dihydric phenol residuum (A) is bis(4-hydroxy phenyl) sulfone.

16. A resin blend of claim 4 wherein the hydroxyl containing epoxide residuum (B) is a halogen substituted saturated monoepoxide.

17. A resin blend of claim 4 wherein the hydroxyl containing epoxide residuum (B) is epichlorohydrin.

18. A resin blend of claim 4 wherein the hydroxyl containing epoxide residuum (B) is epibromohydrin.

19. The resin blend of claim 7 wherein the hydroxyl containing epoxide residuum (B) is epichlorohydrin.

20. The resin blend of claim 8 wherein the hydroxyl containing epoxide residuum (B) is epichlorohydrin.

21. The resin blend of claim 9 wherein the hydroxyl containing epoxide residuum (B) is epichlorohydrin.

22. The resin blend of claim 10 wherein the hydroxyl containing epoxide residuum (B) is epichlorohydrin.

23. The resin blend of claim 11 wherein the hydroxyl containing epoxide residuum (B) is epichlorohydrin.

24. The resin blend of claim 12 wherein the hydroxyl containing epoxide residuum (B) is epichlorohydrin.

25. The resin blend of claim 13 wherein the hydroxyl containing epoxide residuum (B) is epichlorohydrin.

26. The resin blend of claim 14 wherein the hydroxyl containing epoxide residuum (B) is epichlorohydrin.

27. The resin blend of claim 15 wherein the hydroxyl containing epoxide residuum (B) is epichlorohydrin.

References Cited
UNITED STATES PATENTS

| | | | |
|---|---|---|---|
| 3,330,806 | 7/1967 | Borman | 260—830 |
| 3,375,297 | 3/1968 | Barth | 260—830 |
| 3,375,298 | 3/1968 | Fox | 260—830 |
| 3,475,513 | 10/1969 | Benson | 260—830 |

PAUL LIEBERMAN, Primary Examiner

U.S. Cl. X.R.

260—37 Ep, 37 R, 47 Ep, 47 R, 823